April 25, 1961 G. J. H. SAUSELE 2,981,148

PHOTOGRAPHIC DEVICES FOR TYPOGRAPHY

Filed Aug. 14, 1959 3 Sheets-Sheet 1

INVENTOR

George J. H. Sausele

BY Watson, Cole, Grindle & Watson

ATTORNEYS

INVENTOR
George J. H. Sausele
BY Watson, Cole, Grindle & Watson
ATTORNEYS

PHOTOGRAPHIC DEVICES FOR TYPOGRAPHY

Filed Aug. 14, 1959

INVENTOR

George J. H. Sausele

BY Watson, Cole, Grindle & Watson

ATTORNEYS

United States Patent Office

2,981,148
Patented Apr. 25, 1961

2,981,148

PHOTOGRAPHIC DEVICES FOR TYPOGRAPHY

George J. H. Sausele, New Providence, N.J., assignor to American Type Founders Co., Inc., Elizabeth, N.J., a corporation of Delaware Filed Aug. 14, 1959, Ser. No. 833,829

12 Claims. (Cl. 88—24)

This invention relates in general to the art of phototypesetting, and more particularly has to do with means and methods of preparing master plates which bear the fonts of characters from which selection may be made in the production of photo-composition for printing.

The general object of the invention is to provide a novel and improved camera device for photographing on film extremely accurately formed and positioned character representations, from which film the fonts of characters may be printed onto a master character plate; for example, the master disc which follows generally the constructional details of my copending application Serial No. 798,511, filed March 10, 1959. These character discs are particularly suitable for use as master plates in the photo-typesetter which is the subject of another copending application Serial No. 686,233, filed by me on September 25, 1957.

In the development of the novel typesetter of the latter application, speed of operation was of the utmost consideration, and among the important features looking toward this end was the provision of a plurality of identical segmental alphabets or fonts of characters and punctuation on the master disc, of means for rotating the disc always in a forward direction, and of means whereby the disc is stopped for the projection of the next selected character after rotation through an arc only of such length as to bring the desired character of the next adjacent font into photographing position. Thus with three identical symmetrically disposed fonts the movement of the disc for each exposure averages approximately 60° while with only one font on a disc the average rotary movement of the disc for each character selection would be approximately 180°.

In the examples of master plate construction disclosed in my copending applications, three segmental fonts are provided, and three corresponding stop pins are accurately fixed upon the plate to protrude therefrom. On the typesetter adjacent the master plate, there is provided an arcuate set of stop pin abutment blades, one blade for each of the characters of the font borne by the master plate segments. It will be readily understood that, whatever the master disc stopping expedients employed, the cooperating elements on the disc and in the typesetter must be located with great precision for obtaining accurately aligned and spaced copy comparable to the best typography heretofore obtained by earlier and more laborious methods.

Also, it is of equally great importance that the characters, whether letters, numerals, or punctuation marks, be imprinted on the disc with the utmost accuracy, not only with respect to alignment and spacing but with the maximum sharpness of outline.

The invention in its preferred embodiments contemplates the provision of a camera installation of quite sturdy construction, the supporting framing comprising rather heavy webbed rolled or cast structural metal members resistant to warping, twisting, or distortion of any sort. A light-tight enclosure is positioned at an intermediate point of the superstructure and contains lens and masking means for closely delineating the character or set of similar characters being exposed, and supports a shutter of suitable construction.

Also housed within the casing or enclosure is a rotatable film support having accurately machined film positioning elements thereon and a novel and improved vacuum system for causing the film to adhere to the flat rectilinearly disposed surface of the support.

The camera device is completed by the provision of a character matrix support similar in general character to the copy holder of a process camera, but exceedingly more accurate in its positioning of the character matrices or cards; and the provision of novel means for rotating the film holder in the two stages necessary to first select the position for the particular character in the alphabetical scheme appropriate to the font used, and secondly to repeat the exposure of the selected set of characters for each of the segmental groupings to be applied to the master disc. This positioning of the film support must be done with the utmost accuracy and the means provided by the present invention accomplishes this purpose in a highly satisfactory manner.

Other objects and features of novelty will be apparent from the following specification when read in connection with the accompanying drawings in which one embodiment of the invention is illustrated by way of example.

Figures 1, 2:
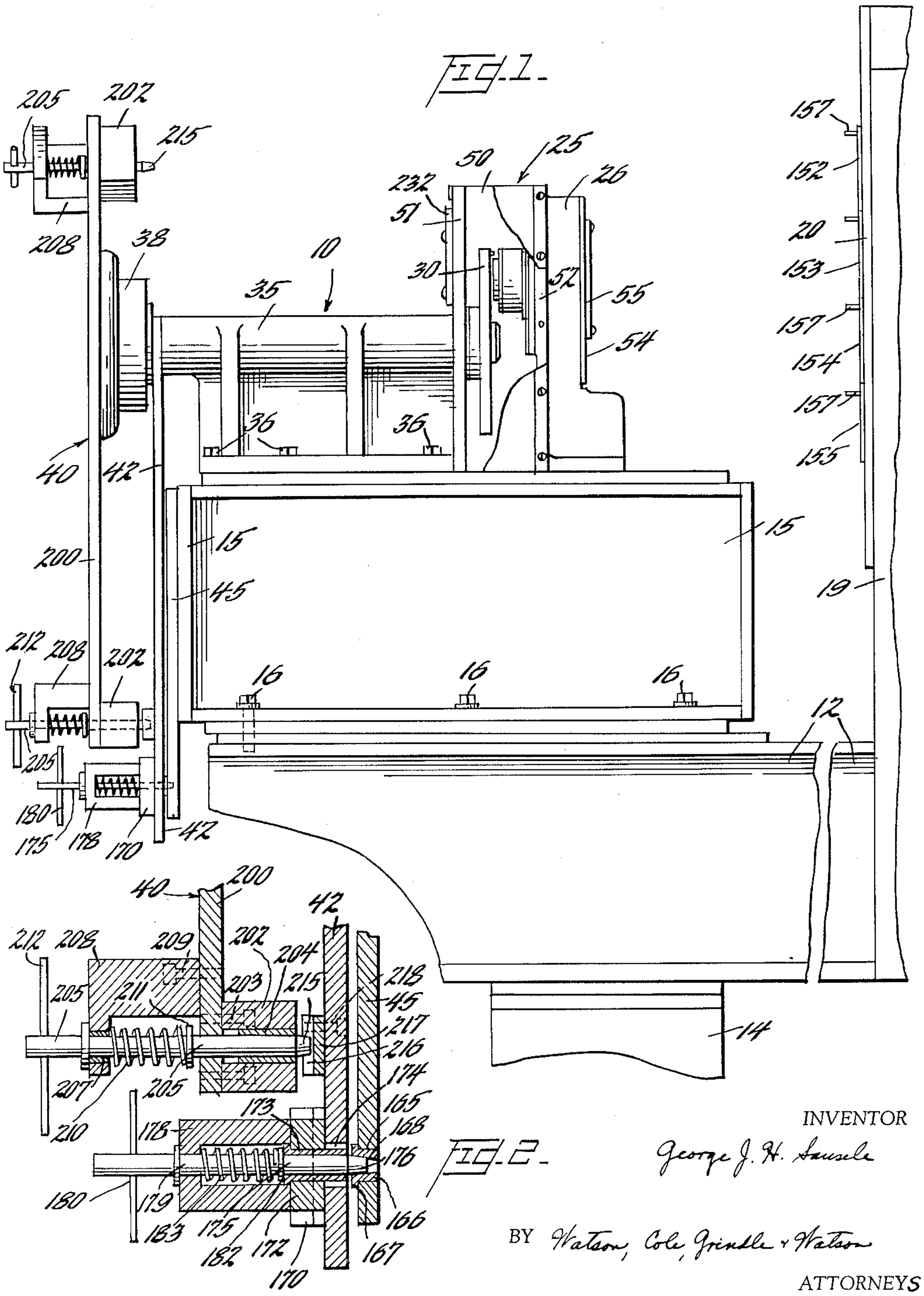
Figure 1 is a somewhat diagrammatic view in side elevation of a camera installation embodying the principles of the invention.
Figure 2 is an enlarged detail vertical sectional view of a portion of the selecting means for positioning the film of the camera, shown in the lower left-hand portion of Figure 1, this view being taken on line 2—2 of Figure 3.

The camera device proper which is indicated by the general reference character 10 is mounted on a rather heavy rigid framework for reducing extraneous movement and vibration, this framework comprising basically an assembled structure which may be bolted and welded together in any suitable fashion, the structure including an elongated I-beam 12 which extends for the greater portion of the length of the installation but being broken and foreshortened in Figure 1 for purposes of more compact disclosure. One or more pedestal assemblies 14 are provided to support the longitudinal beam structure 12. Upon the elongated structure 12 nearer the left-hand or operator's end of the device is supported the box weldment 15 which may be bolted to the longitudinal beam frame 12 as at 16.

At the remote right-hand end of the longitudinal beam structure 12, there is erected a vertical framework 19 which carries the copyboard 20 in a rigid rectilinearly and transversely disposed position with respect to the longitudinal line of sight of the camera. The construction and arrangement of the copyboard 20 will be described presently.

The camera proper indicated at 10 comprises a casing structure 25 which is a light-tight enclosure for the film carrying means and also includes a forwardly disposed lens housing assembly 26.

Figures 4, 5, 6:
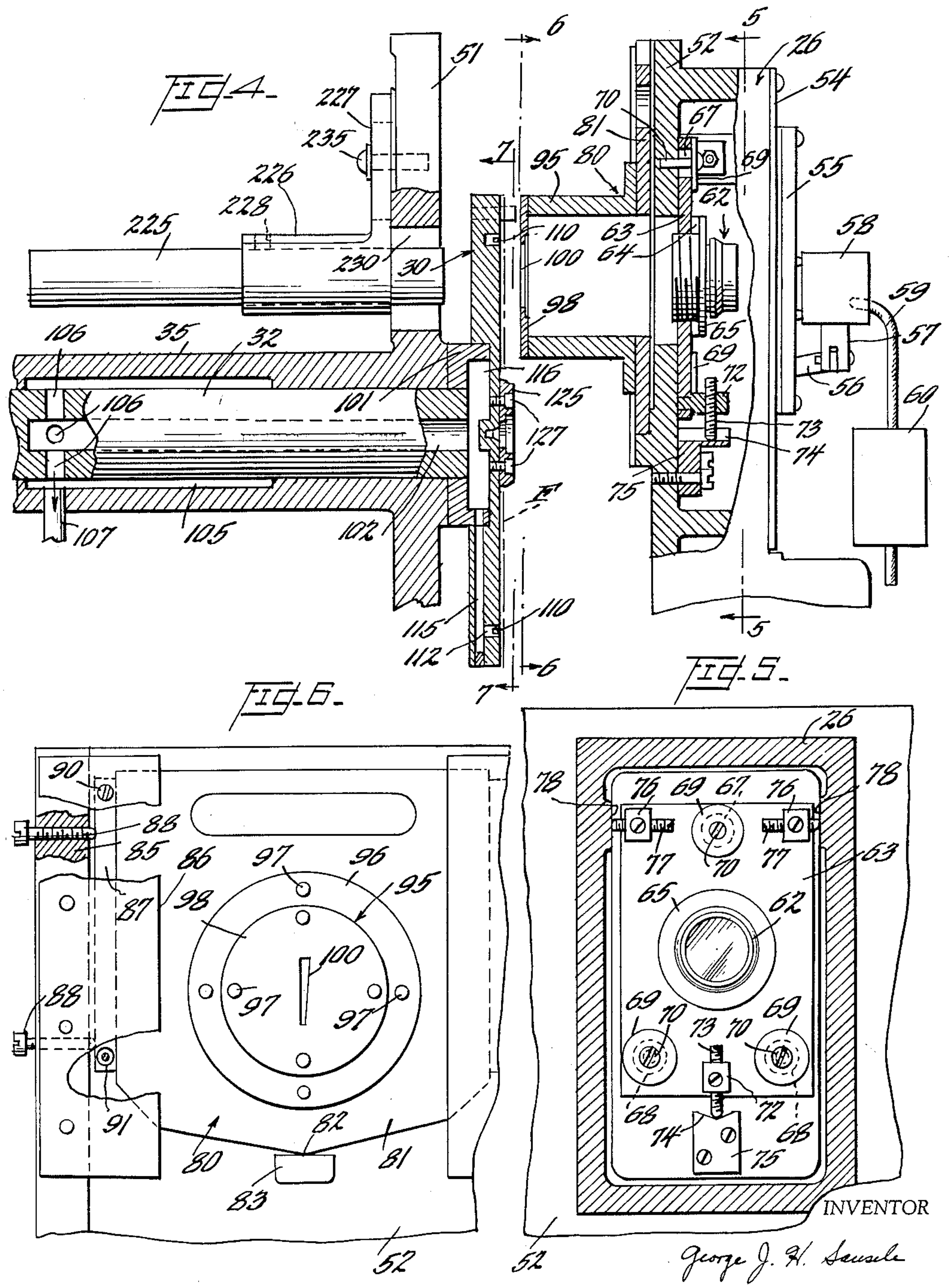
Figure 4 is a vertical longitudinal sectional view taken substantially on line 4—4 of Figure 3.
Figure 5 is a fragmentary transverse sectional view taken on line 5—5 of Figure 4 looking in the direction of the arrows.
Figure 6 is a fragmentary sectional view taken on line 6—6 of Figure 4 as viewed in the direction of the arrows.

Within the casing 25 there is disposed a rotary disc vacuum plate film support 30 which is carried by a longitudinally extending shaft or spindle 32 which is rotatably mounted within the spindle housing 35 as most clearly shown in Figure 4 of the drawings, this housing 35 being formed with a flanged supporting bracket which is rigidly bolted as at 36 to the top plate of the box weldment 15.

The end of the spindle 32 which projects from the spindle housing or bearing support 35 at the operator's end of the device carries the hub assembly 38 to which is rigidly affixed the star arm assembly 40, the purposes and functions of which will be understood as the specification proceeds.

Mounted for rotation about the shaft 32 just outwardly of the bearing housing 35 is the index arm assembly 42. A segment-shaped index plate 45 is bolted in vertical transverse position to the box weldment 15 as shown at 46 in Figure 3. Dowels 47 may also be used in accurately positioning this segmental index plate upon the frame. The purposes and functions of these cooperating parts will be developed as the description progresses.

Returning now to the camera enclosures 25 and 26, and referring more particularly to Figures 4, 5 and 6 of the drawings, it will be seen that the housing 25 consists essentially of the side plate 50, the end plate 51, and the opposite or forward end plate 52 which, in this particular embodiment, comprises an integral part of the cast frame which constitutes the lens housing 26.

Secured to the forward face of the lens housing 26 is the shutter mounting plate 54 upon which is carried the shutter assembly 55 which may be of any known type generally employed in process cameras. The details of this shutter device do not constitute part of the present invention and therefore they are indicated only diagrammatically in this disclosure. A shutter actuating arm 56 is suggested diagrammatically in Figure 4 for operating the shutter and this arm is moved by a plunger 57 which constitutes the armature of a solenoid 58 which is electrically connected by means of the conduit 59 with a rectifier 60 for supplying direct current.

A lens assembly 62 is threaded into a lens supporting plate 63, an adjustable spacer 64, taking the form of an annular washer, disposed between the front of the plate 63 and the flange 65 of the lens mounting.

The means for adjustment of the lens for proper axial alignment is shown most clearly in Figures 4 and 5 of the drawings. The plate 63 is provided with three circular holes, an upper one at 67 and two lowers ones at 68. A washer 69 covers each of these openings 67 and a locking screw 70 passes through openings in the washer 69, thence through the openings 67 and 68, and are threaded into the frame plate 52, thus serving to clamp the lens plate 63 in properly adjusted position.

In order to attain these positions before clamping the devices 69, 70, the lens plate 63 is adjusted vertically and angularly by means of devices now to be described. Centrally of the bottom portion of the plate 63 there is fixed a protruding block or lug 72 and threaded vertically through the lug 72 is a set screw 73. The set screw 73 preferably has an oval point which bears within the apex of the V-notch 74 formed in the bracket 75 secured to the wall 52. Similar adjustment devices are provided for lateral pivotal movement of the plate 63 about the point of the pin 73, and these include the provision of the lugs or blocks 76 adjacent the upper corners of the plate 63 through which blocks the set screws 77 are threaded, the points of the set screws bearing against the flat faces 78 formed on the side walls of the lens housing 26. It will be readily understood that after the adjustments of the several screws 73 and 77 are made, the screws 70 are manipulated to clamp the plate firmly to the wall 52 as by means of the washers 69.

Rearwardly of the wall 52 and within the camera housing 25 is disposed the aperture plate or mask assembly designated generally by the numeral 80. This assembly comprises a plate 81 which is provided with converging portions at its bottom edge, which portions meet at an apex 82 supported upon the projecting bracket lug 83 formed on the rear face of the partition wall 52. The plate 81 is disposed between marginal flanges 85 over which are secured the guide plates or rails 86 which overlap the edges of the aperture plate 81. Gibs 87 are disposed inwardly of the flanges or shoulders 85 and in contact with the opposite side margins of the aperture plate 81 adjusting set screws or bolts 88 bear upon the outer edges of the gibs and through manipulation of these set screws on opposite sides of the device the aperture carrying plate 81 may be laterally or angularly adjusted to bring the aperture 100 in the proper focal axis. Once the gibs are in proper adjustment the locking screws 90 may be tightened, these screws passing through enlarged openings 91 in the gibs, which allow for the slight lateral adjusting movement thereof.

Mounted upon the plate 81 is the flanged tubular mask support 95, the flange 96 of which is bolted as at 97 to the plate 81. An aperture plate 98 is secured as by means of the screws 99 to the rear end of the tubular part 95 and this plate carries the slot-like aperture 100 which is preferably of an elongated somewhat wedge-shaped slot of a size conforming generally to the representation of a single group of four characters to be provided in the various case and face variations upon the master plate to be prepared by the use of the present device.

This mask assembly is removable so as to facilitate loading of film on the vacuum face plate 30. The mask surface must be close to surface of the film for good masking yet it cannot be allowed to touch the film because scratching of the film surface would occur upon indexing the film.

Figures 3, 7, 8:
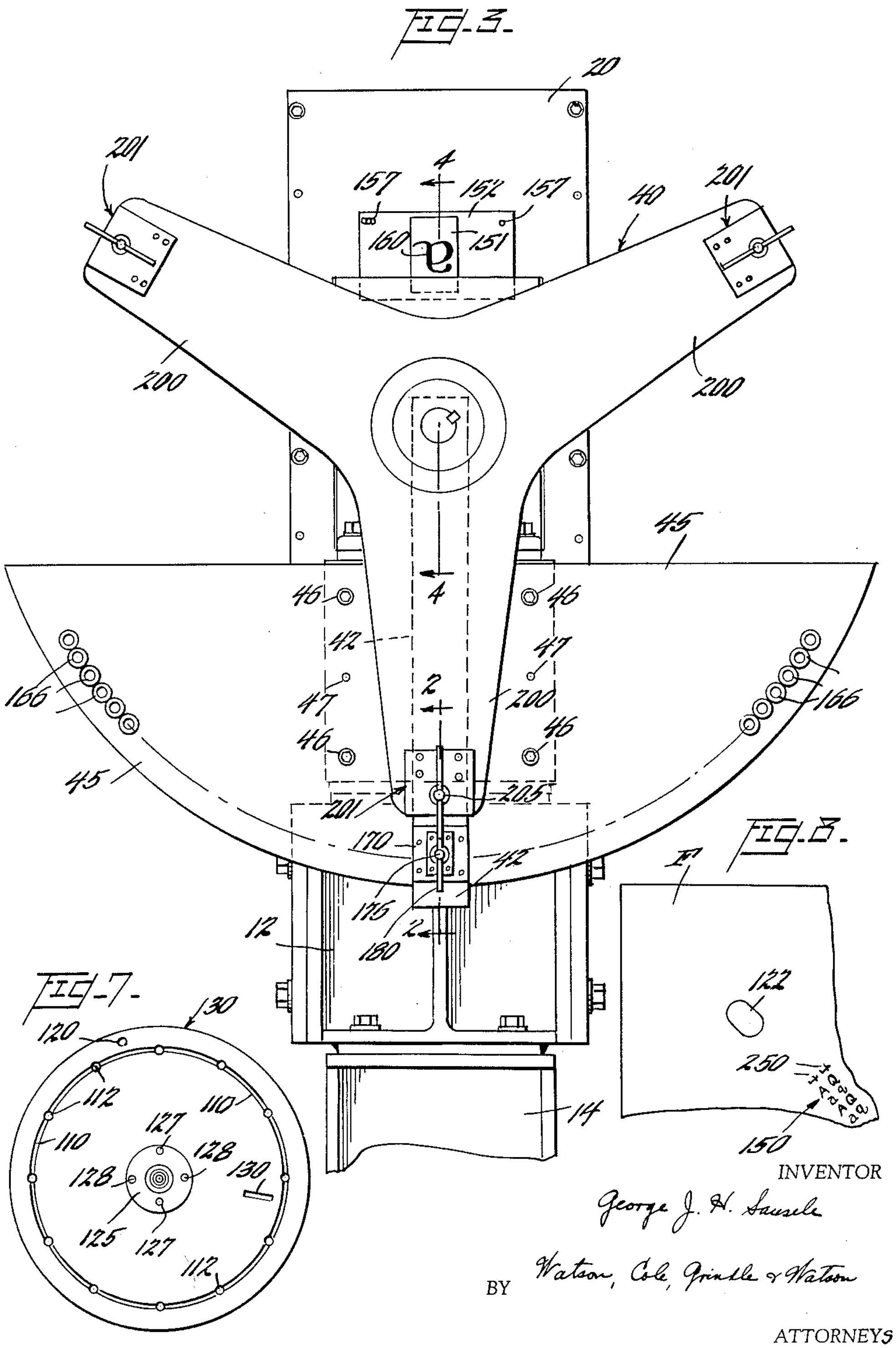
Figure 3 is a view in front elevation of the camera installation, that is, as seen from the operator's end of the device.
Figure 7 is another transverse vertical sectional view taken on line 7—7 of Figure 4 in the direction of the indicating arrows, and on a considerably reduced scale.
Figure 8 is a fragmentary plan view of a corner of the film employed in the disclosed process.

The disc-like vacuum plate for supporting the film has been designated by the general reference numeral 30 and its construction and operation will be best understood by referring to Figures 4, 7 and 8 of the drawings. The plate 30 itself is rigidly mounted, as by brazing, to the hollow cup-like hub element 101 which is in turn brazed to the end of the rotary shaft 32 which is carried in the bearing housing 35 already described. This shaft 32 is hollow, having a tubular passageway 102 formed therein and extending for at least a portion of its length toward the operator's end of the installation. Within the bearing housing 35 there is formed a cylindrical enlargement 105 which provides an annular chamber surrounding a portion of the shaft through which the radial passageways 106 are bored, these passageways intersecting the axial passageway 102. A tubular conduit 107 serves to connect the enlarged bore portion 105 of the housing 35 with a source of vacuum.

The face of the vacuum disc 30 is provided with a circular groove 110 which is intersected at fairly frequent intervals by the openings 112 drilled into the face of the disc. Radially extending passageways 115 are drilled through the disc 30, these passageways also extending through the flange of the hub member 101 and affording communication between the holes 112 and the intersecting groove 110 and the hollow interior 116 of the hub member 101, which interior portion is in immediate communication with the axial bore 102 of the shaft 32. Thus, the groove 110 in the face of the disc is continually in communication with the source of vacuum and serves to cause the film F to adhere closely to the accurately machined and perfectly flat surface of the disc.

In order to locate the film F circumferentially with a high degree of accuracy, the precisely machined dowel pin 120 projects from the plate 30 as shown in Figure 7 and this pin extends through the radially elongated slot 122 formed in the film. The width of the slot 122 accurately conforms to the diameter of the locating dowel pin 120 on the disc, but radial clearance is allowed for insuring the proper centering of the disc which will now be described. An annular boss 125 is fixed concentrically with the disc 30 with as great precision as possible and the machining of the periphery of the boss 125 is also very precisely done within minimum tolerances. The boss 125 is fixed securely to the plate 30 by means of the oppositely disposed set screws 127 and the dowel pins 128. A substantially rectangular radially extending aperture 130 is cut through the disc 30 for a purpose to be described later.

It will be well at this point to refer specifically to the nature of the character delineations to be imprinted upon the film F as shown at 150 in Figure 8 of the drawings and also as delineated in my copending applications and in the Baker application referred to, the characters are arranged in radially extending rows and in preferably three segmental groups. In pursuing the present process, each radial row of characters, comprising upper case and lower case and at least two variations in face, is photographed upon the film by three successive exposures exactly 120° apart. For use as matrices in photographing the characters upon the film, cards or other types of flat material shown at 152, 153, 154 and 155 are carried upon the copyboard 20 as by means of the pegs or pins 157. The characters, such as the letter "A" represented at 160 in Figure 3 of the drawings, are drawn with considerable accuracy of outline, preferably on clear transparent plastic sheets 151 secured to the cards, and the cards 152 are positioned with a high degree of precision upon the pins 157. Of course, in viewing Figure 1 of the drawings it must be considered that the longitudinal frame 12 is broken away and that the copyboard 20 will be disposed at a considerable relative distance from the camera housing 25 and all of the cards 152 will be in focus of the camera.

For the purposes of this presentation, we shall assume that there are forty-four different characters to be included in each of the three fonts or alphabets on the master plate. Thus, there are provided forty-four different positions inscribed upon the segmental index plate 45 which is fixed to the face of the box weldment 15. This is shown clearly in Figure 3 of the drawings. All of these forty-four positions are embraced within 120° of arc on the plate, and each of the forty-four positions corresponds to a radial set of characters as suggested at 150 in Figure 8 of the drawings.

Now these positions numbered from "1" to "44" on the index plate 45 comprise orifices 165 formed in the plate and provided with inserted bushings 166 which are preferably externally flanged as at 167 and having a tapered bore 168 all as clearly depicted in Figure 2 of the drawings.

The index arm assembly 42 is employed to make the initial selection of a group of characters for multiple exposure and for this purpose the end of the arm 42 is provided with spaced undercut or dovetail guide elements 170 within which the apertured block 172 is held. The block 172 is effectively fixed against lateral movement with relation to the arm 42. A tubular guide bushing 173 passes through the opening in the block 172 and extends through a radially enlarged opening 174 in the arm 42. A manually operable indexing pin 175 extends through the bushing 173 and is provided with a tapered end 176 which is adapted to enter selected openings 168 in the bushings 166 on the index plate 45. A substantially U-shaped frame 178 is fixed to the block 172 and is provided with a guide opening 179 through which the outer portion of the indexing pin 175 passes. A transverse bar 180 is carried by the pin for better manipulation thereof. The pin is provided with a shoulder or flange 182 and a coil spring 183 is adapted to be compressed between the shoulder and the upper wall of the frame 178 to urge the pin toward the sockets or openings in the index plate or dial.

In order to move the index arm 42 from one of the forty-four selective positions to the other, the pin 175 is withdrawn against the resilient pressure of the spring 183 and the arm 42 rotated to the proper position, and then the indexing pin is inserted in the tapering opening of the selected spot representing the character grouping which it is desired to photograph.

It will be recalled that the index arm 42 is not fixed to the shaft 32 of the film holder and star arm structure but is free to rotate upon this shaft, and the arm 42 actually serves the function of providing a base point for the positioning of the star arm 40 in its several successive locations.

Upon each end of the arms 200 of the star arm structure 40 are disposed selector pin assemblies 201 similar in many respects to the devices 170—180 carried by the end of the index arm 42.

Referring more particularly to Figures 1 and 2 of the drawings it will be seen that a block 202 is secured upon the inner face of the end of each of the arms 200, as by means of the bolts 203. A bushing 204 is disposed within an opening to the block 202 and slidable within the bushing 204 is the locating pin or spindle 205. This spindle passes through an opening in the arm 200 and through a bushed opening 207 in the overhanging portion of the bracket 208 which is secured to the outer face of the end of the arm 200 as by means of the bolts 209. A coil spring 210 is compressed between the inner face of the overhang of the bracket 208 and the shoulder or flange 211 on the end 205. A manipulating cross bar 212 is applied to the end of the pin 205. The operative end of the pin 205 is slightly tapered as at 215 and is adapted to be received within the tapered groove 216 of the block 217 secured upon the front face of the index arm 42 as by means of the bolts 218.

This positioning arrangement is duplicated upon the end of each of the arms 200 of the star member 40, and it will be readily seen that once the index arm 42 is set at one of the forty-four stations 166 representing a desired character grouping, the setting of the first arm 200 by means of the device 201 will cause the film carrier vacuum disc 30 to position the film F at the proper location to be exposed through the camera device 25, 26 to the character cards 152 supported upon the copyboard 20. Then, without changing the adjustment of the index arm 42 the two succeeding arms 200 of the star wheel 40 are brought into position by means of the locating device 201 and the other two exposures are made of the same grouping on the other arcuate fonts to be carried by the master plate.

For the purpose of accurately checking the alignment of the various optical elements, a device is provided which is shown in somewhat diagrammatic form in Figure 4 of the drawings. This device includes a tubular microscope member 225 which is adjustably carried within the sleeve 226 supported from the bracket 227. The microscope may be held in fixed longitudinal position within the sleeve 226 as by means of the set screw 228 and the bracket 227 is adapted to be secured to the left-hand face of the wall or partition member 51 constituting the rear wall of the light-tight enclosure 25. This wall 51 is provided with an opening 230 through which the microscope 225 may extend, which opening is normally closed by means of the plate 232 shown in Figure 1 of the drawings. However, when it is desired to use the microscope in checking the alignment of the optical elements, the plate 232 is supplanted by the microscope carrying bracket 227 which may be secured to the wall 51 as by means of the fastening element 235.

The microscope is thus aligned with the axis of the lens 62, the opening in the shutter 55, the mask slot 100, and the slot 130 formed in the film carrier 30, and any corrective adjustment of the parts, especially those of the lens carrier of Figure 5 and the mask supporter of Figure 6, may be readily effected.

Attention is directed to the index markings shown at 250 and occurring at the head of each radial column of characters. These are for accurately lining up the characters and are used also for other purposes, as for example, for initiating a momentary flash of a light source in the event a method of presenting the characters from a continuously rotating disc by means of a high speed flash of light is employed.

It is understood that various changes and modifications may be made in the embodiment of the invention illustrated and described herein without departing from the scope of the invention as defined by the following claims.

Having thus described the invention, what is claimed as new and desired to be secured by Letters Patent is:

1. A camera device particularly adapted for the accurate reproduction of a predetermined pattern of images at intervals about circular film with fixed predetermined angular displacement, said camera device comprising, in combination, a rigid supporting frame, a copyboard at one end of said frame, means for removably supporting matrices of said images upon said copyboard, a light-tight camera housing carried upon said frame, a lens adjustably disposed in said housing and directed toward said copyboard, a shutter device on said housing for controlling the exposure, a rotary adjustable film support disposed within said housing, means for rotating said film support from without said housing, and indexing means for setting the rotating means at selected initial points for the respective first exposures of various images and for moving said rotating means and thus the film support through fixed predetermined angular displacements for repeating the exposures of the same image as selected by the initial setting at precise intervals about the film, said indexing means comprising a gauging member, means for fixing said gauging member with respect to said frame adjacent said film support rotating means, and a rotatable indexing member carried by said rotating means, engaging elements on said rotatable member at exactly spaced intervals around it corresponding to the desired angular spacing of said image reproductions, and a cooperating element on said fixed gauging member adapted to be successively engaged by said engaging elements for successive exposures of a given repeated image, and an index plate carried by said frame adjacent said gauging member, said index plate carrying a plurality of stop elements arranged in a similar pattern to the desired pattern of images to be imposed upon the film, and each representing a different selectable image, the means for fixing said gauging member being adjustable to fixedly engage selected ones of said stop elements, the successive engagements of the elements of said rotatable indexing member and said gauging means serving to set the film for successive exposures of the selected images for each setting of the gauging member.

2. The camera device set forth in claim 1 in which the means for rotating said film support comprises a shaft fixed axially to said support and having bearings for rotation in said frame, the rotatable indexing member comprises a manually adjustable member fixed upon a projecting end of said shaft, and the gauging means comprises an arm rotatably but accurately centered upon said shaft.

3. The camera device set forth in claim 2 in which the interlocking interengaging elements on the index plate, the gauging means and the rotatable indexing member, comprise accurately ground socket means on one of the cooperating elements, and spring-pressed manually retractible plungers on the other of said members accurately fitted to said socket means, and one of the interengaging elements between said gauging means and said plate being free to shift radially upon the member which carries it but not circumferentially.

4. The camera device set forth in claim 1 in which the means for rotating the film comprises a shaft fixed axially to said support and having bearings for rotation in said frame, the rotatable indexing member comprising a manually adjustable spider having rotating spokes fixed upon the projecting end of said shaft to rotate therewith, said gauging means comprises a single radiating arm rotatably but accurately centered upon said shaft adjacent the indexing member, and each spoke of said indexing member carries one of said engaging elements for cooperating with the engaging element on the gauging arm.

5. A camera device particularly adapted for the accurate reproduction of an image at intervals about an arcurate film with fixed predetermined angular displacement, said camera device comprising, in combination, a rigid supporting frame, a copyboard at one end of said frame, means for removably supporting matrices of said images upon said copyboard, a light-tight camera housing carried upon said frame, a lens adjustably disposed in said housing and directed toward said copyboard, a shutter device on said housing for controlling the exposure, a rotary adjustable film support disposed within said housing, means for rotating said film support from without said housing, and indexing means for moving said rotating means and thus the film support through fixed predetermined angular displacements for repeating the exposures of the same image at precise intervals about the film, said film support comprising a flat disc and the means for rotating said support comprising a shaft fixed centrally to said disc, cylindrical bearing means on said supporting frame receiving said shaft; said disc having a plurality of fine openings in its film carrying surface, a hollow hub, and passageways leading through the disc from said openings to the interior of said hollow hub, a bore in said shaft communicating with said hollow hub, and means in said bearing for placing the bore of said shaft in communication with a source of vacuum.

6. A camera device particularly adapted for the accurate reproduction of an image at intervals about an arcuate film with fixed predetermined angular displacement, said camera device comprising, in combination, a rigid supporting frame, a copyboard at one end of said frame, means for removably supporting matrices of said images upon said copyboard, a light-tight camera housing carried upon said frame, a lens adjustably disposed in said housing and directed toward said copyboard, a shutter device on said housing for controlling the exposure, a rotary adjustable film support disposed within said housing, means for rotating said film support from without said housing, and indexing means for moving said rotating means and thus the film support through fixed predetermined angular displacements for repeating the exposures of the same image at precise intervals about the film, said film support comprising a flat disc and the means for rotating said support comprising a shaft fixed centrally to said disc, cylindrical bearing means on said supporting frame receiving said shaft; said disc having a plurality of fine openings in its film carrying surface, said openings being spaced apart in a circular pattern about said surface, and a fine circular groove in said surface intersecting said openings, a hollow hub for said disc and radial passageways within said disc connecting said openings with the interior of said hollow hub, a bore in said shaft extending from said hollow hub to a point well within the shaft bearing, at least one radial duct intersecting said bore and opening through an orifice in the outer surface of said shaft, an enlargement in the inner surface of said bearing surrounding the orifice of said duct, and a passageway through said bearing communicating with a source of vacuum.

7. The camera device set forth in claim 6 in which the face of said disc is centrally provided with an accurately finished embossment to be received in an exactly similarly shaped opening in the film, and an accurately positioned guide pin projected from the face of the disc at a point spaced radially from the axis and is adaptable to be received in a guide opening in an outer portion of the film.

8. A camera device particularly adapted for the accurate reproduction of an image at intervals about an arcuate film with fixed predetermined angular displacement, said camera device comprising, in combination, a rigid supporting frame, a copyboard at one end of said frame, means for removably supporting matrices of said images upon said copyboard, a light-tight camera housing carried upon said frame, a lens adjustably disposed in said housing and directed toward said copyboard, a shutter device on said housing for controlling the exposure, a rotary adjustable film support disposed within said housing, means for rotating said film support from without said housing, and indexing means for moving said rotating means and thus the film support through fixed predetermined angular displacements for repeating the exposures of the same image at precise intervals about the film, said film support comprising a flat disc arranged within said housing so that the optical axis of said lens and shutter intersects the disc at a point spaced radially from its center, whereby each rotary adjustment of the disc brings a new area of the film into position for exposure, a sight opening formed through said disc at a point spaced radially from the center thereof and in line with said optical axis, and an optical viewing device positioned in the wall of said housing behind said disc for checkng the alignment of the various elements along said axis.

9. The camera device set forth in claim 8 in which said optical device is removable and a removable light-tight closure is provided for covering the opening left by the removal of said optical device.

10. A camera device particularly adapted for the accurate reproduction of a predetermined pattern of images at intervals about circular film with fixed predetermined angular displacement, said camera device comprising, in combination, a rigid supporting frame, a copyboard at one end of said frame, means for removably supporting matrices of said images upon said copyboard, a light-tight camera housing carried upon said frame, a lens adjustably disposed in said housing and directed toward said copyboard, a shutter device on said housing for controlling the exposure, a rotary adjustable film support disposed within said housing, means for rotating said film support from without said housing, and indexing means for setting the rotating means at selected initial points for the respective first exposures of various images and for moving said rotating means and thus the film support through fixed predetermined angular displacements for repeating the exposures of the same image as selected by the initial setting at precise intervals about the film, said indexing means comprising a gauging member, means for fixing said gauging member with respect to said frame adjacent said film support rotating means, and a rotatable indexing member carried by said rotating means, engaging elements on said rotatable member at exactly spaced intervals around it corresponding to the desired angular spacing of said image reproductions, and a cooperating element on said fixed gauging member adapted to be successively engaged by said engaging elements for successive exposures of a given repeated image, an index plate carried by said frame adjacent said gauging member, said index plate carrying a plurality of stop elements arranged in a similar pattern to the desired pattern of images to be imposed upon the film, and each representing a different selectable image, the means for fixing said gauging member being adjustable to fixedly engage selected ones of said stop elements, the successive engagements of the elements on said rotatable indexing member and said gauging means serving to set the film for successive exposures of the selected images for each setting of the gauging member, said film adapted to receive plural exposures of a radial series of images from a similar series of matrices on the copyboard, and a mask having a radially extending narrow slot therein outlining said series of images, means for adjustably supporting said mask within said housing between the lens and the film carrier.

11. The camera device set forth in claim 10 wherein said mask is supported on a tubular element having a flange, and adjustable tilting and locking means are provided for pivotally aligning said mask and fixing it in adjusted position.

12. A camera device particularly adapted for the accurate reproduction of an image at intervals about an arcuate film with fixed predetermined angular displacement, said camera device comprising, in combination, a rigid supporting frame, a copyboard at one end of said frame, means for removably supporting matrices of said images upon said copyboard, a light-tight camera housing carried upon said frame, a lens adjustably disposed in said housing and directed toward said copyboard, a shutter device on said housing for controlling the exposure, a rotary adjustable film support disposed within said housing, means for rotating said film support from without said housing, and indexing means for moving said rotating means and thus the film support through fixed predetermined angular displacements for repeating the exposures of the same image at precise intervals about the film, and means for adjusting said lens axially, radially, and circumferentially of said rotary film support, said adjusting means comprising a plate, annular lens gripping means threaded into an opening in said plate, a fixed fulcrum carried by said housing at the center or on the bottom of said plate, a radially adjustable pivot member carried by said plate and adapted to rest on said fulcrum, and adjusting means for tilting said plate and securing it in tilted position.

References Cited in the file of this patent

UNITED STATES PATENTS

| | | |
|---|---|---|
| 1,893,439 | Ogden | Jan. 3, 1933 |
| 2,412,252 | Contner | Dec. 10, 1946 |
| 2,715,862 | Moyroud | Aug. 23, 1955 |

FOREIGN PATENTS

| | | |
|---|---|---|
| 21,177 | Great Britain | Sept. 17, 1912 |